US012135277B1

(12) United States Patent
Dai et al.

(10) Patent No.: US 12,135,277 B1
(45) Date of Patent: Nov. 5, 2024

(54) COOPERATIVE POLARIZATION SKYLIGHT BACKGROUND RADIATION MEASUREMENT DEVICE AND METHOD

(71) Applicant: Hefei Institutes of Physical Science, CAS, Hefei (CN)

(72) Inventors: Congming Dai, Hefei (CN); Wenqing Xu, Hefei (CN); Jie Zhan, Hefei (CN); Shuai Li, Hefei (CN); Gang Xu, Hefei (CN); Rui Wang, Hefei (CN)

(73) Assignee: Hefei Institutes of Physical Science, CAS (CN)

( * ) Notice: Subject to any disclaimer, the term of this patent is extended or adjusted under 35 U.S.C. 154(b) by 0 days.

(21) Appl. No.: 18/656,937

(22) Filed: May 7, 2024

(30) Foreign Application Priority Data

Jul. 4, 2023 (CN) .......................... 202310806988.X

(51) Int. Cl.
*G01N 21/21* (2006.01)
*G01N 21/25* (2006.01)
(Continued)

(52) U.S. Cl.
CPC ......... *G01N 21/211* (2013.01); *G01N 21/255* (2013.01); *G01N 21/27* (2013.01);
(Continued)

(58) Field of Classification Search
CPC .... G01N 21/211; G01N 21/255; G01N 21/27; G01N 21/3581; G01N 2021/213;
(Continued)

(56) References Cited

U.S. PATENT DOCUMENTS

2022/0125280 A1* 4/2022 Tyan ................... A61B 5/0035

FOREIGN PATENT DOCUMENTS

CN 101464190 A * 6/2009 ............. G01J 3/447
CN 103234637 A 8/2013
(Continued)

OTHER PUBLICATIONS

Meynants, A 35 mm 13.89 million pixel CMOS active pixel image sensor, International Image Sensor Society, May 15-17, 2003 IEEE workshop (Year: 2003).*
(Continued)

*Primary Examiner* — Michelle M Iacoletti
*Assistant Examiner* — Judy Dao Tran
(74) *Attorney, Agent, or Firm* — Maine Cernota & Curran

(57) ABSTRACT

Provided are a cooperative polarization skylight background radiation measurement device and method, belonging to the field of polarized radiation remote sensing. The device includes a measurement probe, a lower computer control system, a two-dimensional turntable, a base and data transmission interface, as well as an upper computer. The method includes the following steps: the cooperative skylight background radiation polarization measurement device is initialized, a polarization wheel is returned to a zero position, and dark noise is collected by a double-path spectrometer; then a measurement mode is selected for measurement; and finally, spectral polarization data of each wave band acquired by the double-path spectrometer and a division-of-focal plane polarization camera is transmitted to the upper computer through a data line, original spectral light intensity data is calculated according to a measurement principle, and finally a degree of polarization and an azimuth angle of polarization are obtained.

20 Claims, 9 Drawing Sheets

(51) Int. Cl.
  *G01N 21/27* (2006.01)
  *G01N 21/3581* (2014.01)
  *G01J 3/02* (2006.01)
  *G01J 3/447* (2006.01)
  *G01J 4/00* (2006.01)
  *G01N 21/47* (2006.01)

(52) U.S. Cl.
  CPC ........ *G01N 21/3581* (2013.01); *G01J 3/0224* (2013.01); *G01J 3/0289* (2013.01); *G01J 3/447* (2013.01); *G01J 4/00* (2013.01); *G01N 2021/213* (2013.01); *G01N 2021/4792* (2013.01); *Y02A 90/10* (2018.01)

(58) Field of Classification Search
  CPC ............ G01N 2021/4792; G01J 3/0224; G01J 3/0289; G01J 3/447; G01J 4/00; Y02A 90/10
  See application file for complete search history.

(56) References Cited

FOREIGN PATENT DOCUMENTS

| CN | 106840405 | A | * | 6/2017 | ................ G01J 4/00 |
| CN | 114061753 | A | | 2/2022 | |
| CN | 115752467 | A | | 3/2023 | |
| CN | 116519137 | B | | 8/2023 | |
| JP | 2023007699 | A | * | 1/2023 | ................ G01J 3/26 |

OTHER PUBLICATIONS

First Office Action by CNIPA for Application No. CN202310806988.X mail date Aug. 5, 2023, 13 pages.

Notification to Grant Patent Right for Invention for Application No. CN 202310806988.X mail date Aug. 23, 2023, 3 pages.

* cited by examiner

COOPERATIVE POLARIZATION SKYLIGHT BACKGROUND RADIATION MEASUREMENT DEVICE AND METHOD

RELATED APPLICATIONS

This patent application claims the benefit and priority of Chinese Patent Application No. 202310806988.X filed with the China National Intellectual Property Administration on Jul. 4, 2023, the disclosure of which is incorporated by reference herein in its entirety as part of the present application.

FIELD OF THE INVENTION

The present disclosure belongs to the field of polarized radiation remote sensing, and in particular to a cooperative polarization skylight background radiation measurement device and method.

BACKGROUND OF THE INVENTION

The skylight background radiation parameter is one of the important parameters of atmospheric optical characteristics. Due to the presence of atmospheric molecules and aerosol particles in the sky, sunlight is scattered from an unpolarized state to form polarized light, which shows a certain distribution law and contains information on a degree of polarization and an angle of polarization. The spatial distribution characteristics of the skylight background radiation polarization include symmetry, neutral point, zenith, sun position, etc., but the acquisition of the spatial distribution characteristics is easily affected by complex changes in atmospheric conditions and limited by practical detection techniques, which has become an important factor limiting the effective detection and observation of the spatial distribution characteristics in ground-based remote sensing. At present, the main polarization measurement methods include a division-of-time method, a division-of-amplitude method, a division-of-aperture method and a division-of-focal plane method, among which the division-of-time method is widely used in aerosol polarization observation networks in China and other countries, but such instruments are difficult to overcome the disadvantages of harsh and complex environment, and low robustness. Moreover, as the division-of-time method obtains light intensity responses in different directions at different times, it is only suitable for static scenes.

SUMMARY OF THE INVENTION

In order to solve the technical problem above, the present disclosure provides a cooperative polarization skylight background radiation measurement device and method. The advantages of polarization measurements using a division-of-time method and a division-of-focal plane method are integrated, directional fixed-point measurement and all-weather automatic measurement are achieved, and polarization data with the same spatial-temporal characteristics is obtained.

In order to achieve the purpose above, the present disclosure provides the following technical solution:

A cooperative polarization skylight background radiation measurement device includes a measurement probe, a lower computer control system, a two-dimensional turntable, a base and data transmission interface, as well as an upper computer. The measurement probe is fixed to a pitch axis of a support, and is supported and driven by the two-dimensional turntable which is symmetrical U-shaped. Three parallel light cylinders, that is, a polarization imaging light cylinder, a visible light measurement light cylinder, and a near infrared measurement light cylinder, are assembled at a front end of the measurement probe. A division-of-focal plane polarization camera, a polarization wheel, and a double-path spectrometer are installed inside the measurement probe corresponding to the three parallel light cylinders, respectively.

Further, 12 holes, which are a pair of solid holes, a pair of 0° polarizer holes, a pair of 45° polarizer holes, a pair of through holes, a pair of 90° polarizer holes, and a pair of 135° polarizer holes, are formed in the polarization wheel. Each pair of holes is installed in a centrally symmetrical manner for measuring dark noise, four groups of polarized radiation, and background light.

Further, a fisheye lens is installed at a head part of the polarization imaging light cylinder, a band-pass filter is embedded into a middle part of the polarization imaging light cylinder, and the division-of-focal plane polarization camera is connected to a rear end of the polarization imaging light cylinder. the fisheye lens has a field of view of 185°, locked aperture control, and fixed focus, and configured for capturing a full-sky image; center wavelength of the band-pass filter is selected from five bands: 405 nm, 450 nm, 550 nm, 660 nm, and 850 nm, has a full width at half maximum (FWHM) of 10 nm, and is configured for detecting polarized light in a wavelength range from visible light to near infrared. The division-of-focal plane polarization camera is configured for polarized imaging of skylight background radiation, and has a black-and-white Complementary Metal-Oxide-Semiconductor (CMOS) sensor with 5 million pixels, and a microlens array and a polarizer array are integrated on a target surface of the division-of-focal plane polarization camera.

Further, the polarizer array is composed of wire-grid polarizers in four directions, with a transmission axis of 0°, 45°, −45°, and 90°, respectively, each pixel corresponds to a polarization direction, and pixels of four polarization directions form a super pixel element for imaging calculation. When incident light reaches the polarizer array, a part of the incident light with a polarization direction perpendicular to a wire-grid axis passes through the polarizer array and is received by a photodiode in the CMOS sensor, and a part of the incident light with a polarization direction parallel to the wire-grid axis is reflected and absorbed.

Further, the division-of-focal plane polarization camera scans the whole field of view simultaneously by a global shutter, which is suitable for real-time full-sky imaging.

Further, the visible light measurement light cylinder and the near infrared measurement light cylinder are configured for collecting polarization data of skylight background radiation, and are composed of a field diaphragm group, a lens, polarizers at different angles, light guiding fibers, and a double-path spectrometer. Spectrum collected by the double-path spectrometer is in a range of 400 nm~1100 nm, and has a resolution superior to 1 nm. A receiving field of view of both the visible light measurement light cylinder and the near-infrared measurement light cylinder is 1°. When the background radiation passes through a dustproof window, front and rear field diaphragms and aperture diaphragms of the field diaphragm group are configured to limit the field of view and luminous flux. A focal length of an optical path is 136 mm, a size of a corresponding solar facula is 1.26 mm, and a photosensitive surface of the double-path spectrometer is not less than 2.5 mm.

Further, the visible light measurement light cylinder and the near-infrared measurement light cylinder, as well as a multi-level field diagram are all blackened to ensure that diffused stray light outside a field angle cannot enter the optical path.

Further, the polarization wheel is driven by a 42 mm stepper motor to rotate, a slit is formed in the polarization wheel, and a PNP photoelectric switch is installed in such a way that the polarization wheel passes through middle of the PNP photoelectric switch, and the PNP photoelectric switch outputs a high level signal "1" when encountering the slit, the high level signal is collected by the lower computer control system, the 42 mm stepper motor of the polarization wheel stops rotating, where is set as a zero position. The polarization wheel is blackened to reduce interference caused by light reflection on measurement.

Further, the two-dimensional turntable includes a motor, an encode, and a driver. The motor is a horizontal and pitch motor, and a direct current brushless torque motor is used as the motor, which has a peak torque of 8 N·M and a continuous locked-rotor torque of 3.6 N·M. The encoder employs an absolute grating system with a circular grating as an angle encoder to form an absolute photoelectric encoder, and each position on the motor is encoded through an optical encoder; the driver communicates with a lower computer using a CANopen protocol. The driver is connected to the lower computer control system and the encoder in a servo module. On the one hand, the driver receives an instruction from the lower computer to drive the motor to rotate by a corresponding angle; and on the other hand, the driver obtains a current position of the two-dimensional turntable by reading data from the absolute photoelectric encoder and transmits the current position of the two-dimensional turntable back to the lower computer, which is convenient for the lower computer to check whether the motor has reached a target position or not.

Further, the base and data transmission interface is configured for power supply, camera data transmission, and communication between the upper computer and the lower computer. The upper computer and the lower computer are connected by a network cable, and perform data communication through Transmission Control Protocol/Internet Protocol (TCP/IP).

Further, the present disclosure provides a measurement method for the cooperative polarization skylight background radiation measurement device, including the following steps:

Step one: building the cooperative skylight background radiation polarization measurement device, enabling the base to be moved to face south horizontally, and powering on the device to start;

Step two: initializing the cooperative skylight background radiation polarization measurement device, resetting the polarization wheel to a zero position, and collecting dark noise by the double-path spectrometer;

Step three: selecting a measurement mode for measurement, wherein the measurement mode includes fixed-point measurement mode, solar meridian scanning mode, full-sky scanning mode, and full-sky imaging mode; and Step four: transmitting spectral polarization data of each band acquired by the double-path spectrometer and the division-of-focal plane polarization camera to the upper computer through a data line, calculating original spectral light intensity data according to a measurement principle, and finally obtaining a degree of polarization and an azimuth angle of polarization.

Further, in the fixed-point measurement, the two-dimensional turntable is moved to a sky orientation to be measured, the polarization wheel is rotated, light intensity is collected by the double-path spectrometer, and at each position, the polarization wheel is rotated, and the light intensity is collected by the double-path spectrometer.

In the solar meridian scanning, sun and a solar meridian are positioned by means of an apparent sun trajectory method and a fisheye imaging tracking method, the solar meridian refers to an arc connecting North pole of the earth, sun, and South pole of the earth; an unequal step size is set, the closer to the sun, the greater the step size; the two-dimensional turntable is moved to make the measurement probe scan the solar meridian step by step, the polarization wheel is rotated, and the light intensity is collected by the double-path spectrometer.

In the full-sky scanning, a sun orientation is positioned as a starting point of a horizontal orientation, horizontal and pitching unequal step sizes are set, the closer to the sun, the greater the step size; the two-dimensional turntable is moved to make the measurement probe scan a sky hemisphere step by step, and at each position, the polarization wheel is rotated, and the light intensity is collected by the double-path spectrometer.

In the full-sky imaging, when the two-dimensional turntable drives the measurement probe to point to zenith, a full-sky spectral polarization image is captured by the division-of-focal plane polarization camera, and each super pixel element is divided into four-pixel units by means of a pixel segmentation algorithm, and pixel units with the same polarization direction are combined to form four polarization images; four components of Stokes vector S, which are total light intensity I, two linear polarization components Q and U perpendicular to each other, and a circular polarization component V, are calculated by means of matrix operation, and then a degree of linear polarization DoLP and an azimuth angle of polarization AoP for each super pixel element are calculated as follows:

$$DoLP = \frac{\sqrt{Q^2 + U^2}}{I} \quad (1)$$

$$AoP = \frac{1}{2}\arctan\left(\frac{U}{Q}\right). \quad (2)$$

Further, when the measurement mode is selected for the full-sky imaging, the division-of-focal polarization camera and the double-path spectrometer operate simultaneously to collect full-sky polarization information.

The present disclosure achieves the beneficial effects as follows:

According to the present disclosure, full-sky spectral-polarization collection and imaging can be carried out. The measurement device integrates the advantages of the polarization measurements using the division-of-time method and the division-of-focal-plane method, which not only has the advantages of directional fixed-point measurement, wide spectral range and all-weather automatic measurement, but also makes the polarization data have the same spatial-temporal characteristics. The present disclosure can be applied to fields, such as atmospheric polarization remote sensing, polarization navigation, and space target detection.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

To make the purpose, features and advantages of the present disclosure more clearly and understandably, the following further describes the present disclosure in detail with reference to the accompanying drawings and embodiments. It should be understood that the specific embodiments described here are only used to explain rather than limiting the present disclosure. In addition, the technical features involved in various embodiments of the present disclosure described below can be combined with each other as long as they do not conflict with each other.

Figure 1:
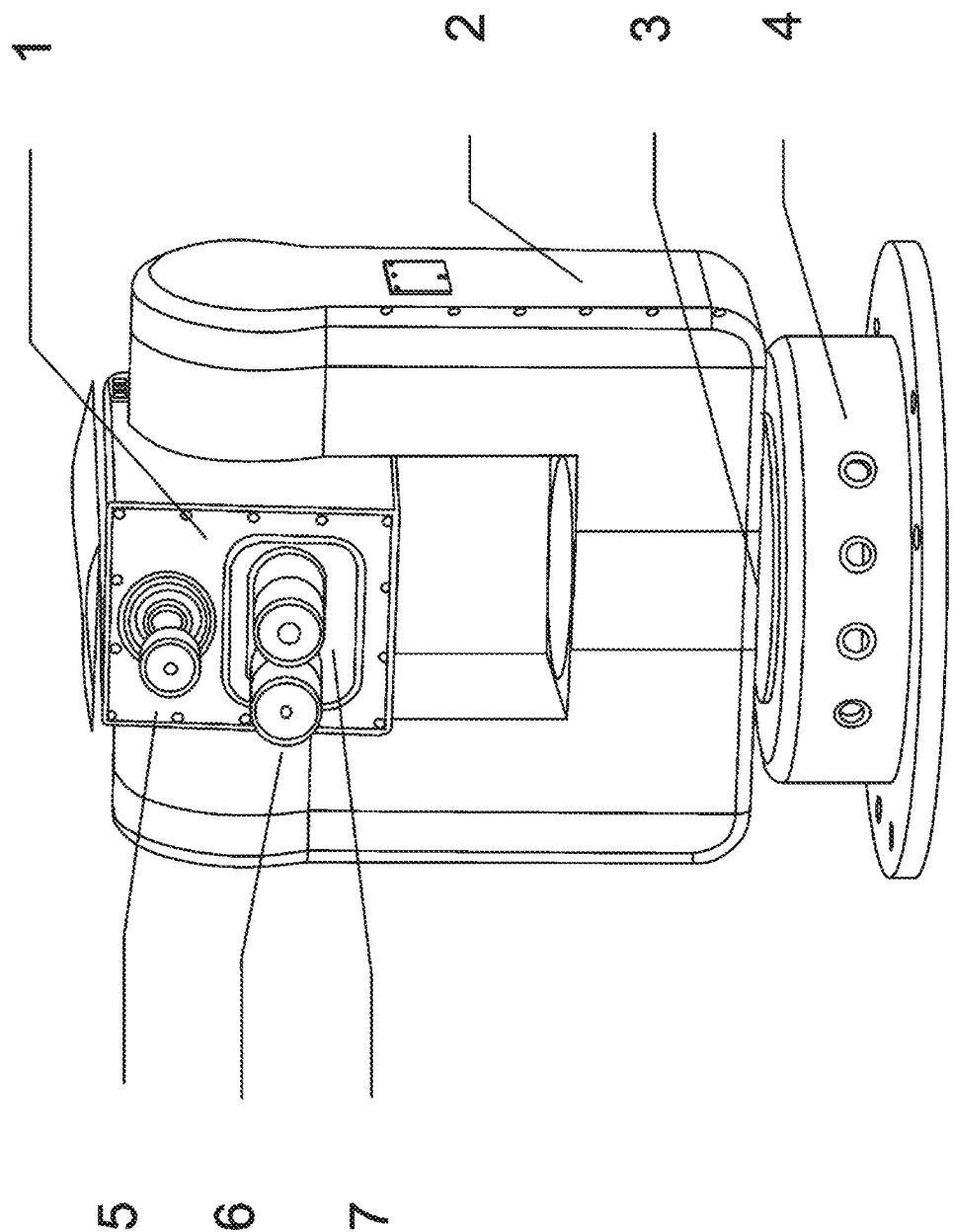
FIG. 1 is a schematic diagram of a cooperative polarization skylight background radiation measurement device according to the present disclosure.
Figure 3:
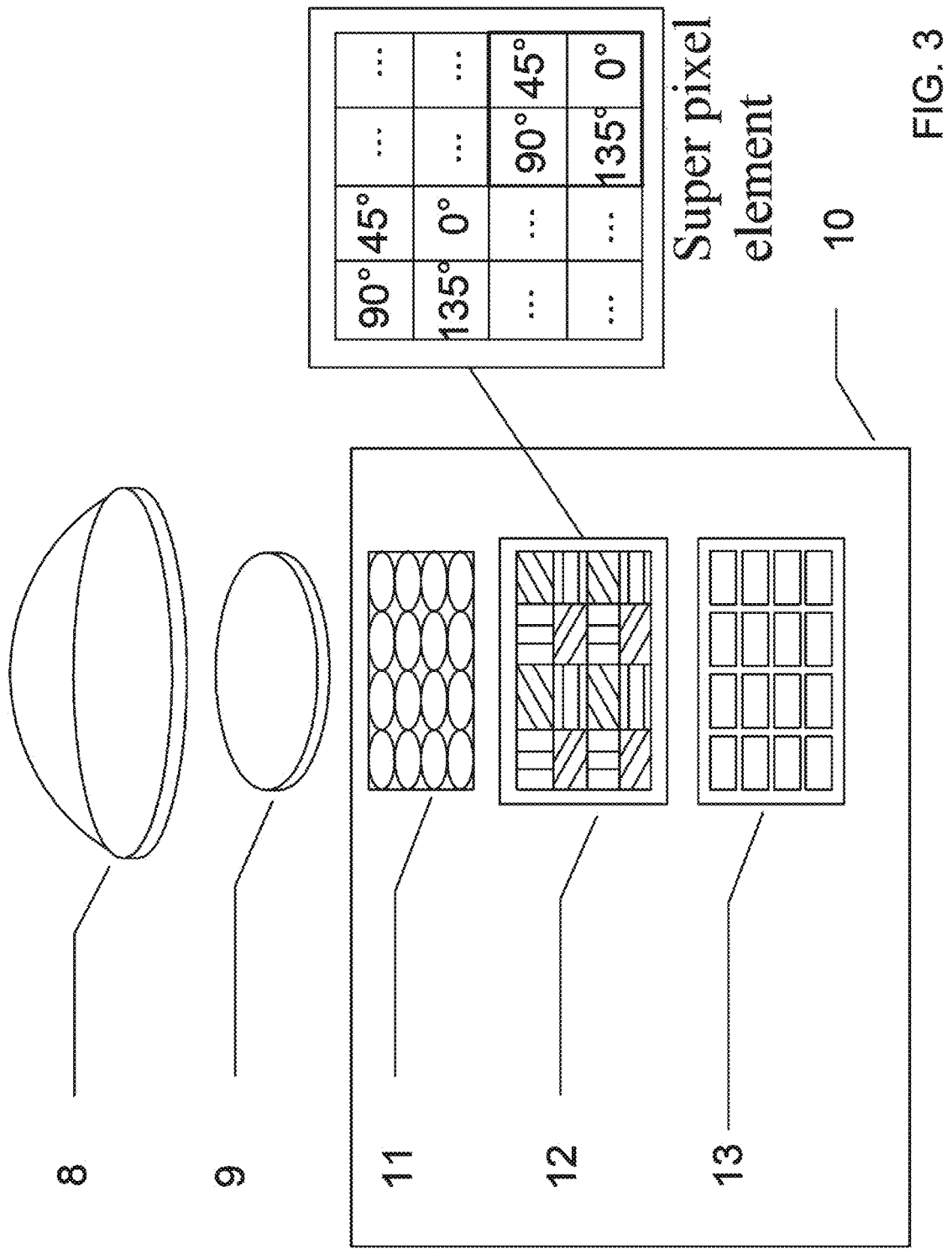
FIG. 3 is a schematic diagram of an imaging structure of a polarization imaging light cylinder.

As shown in FIG. 1 and FIG. 3, a cooperative polarization skylight background radiation measurement device includes a measurement probe 1, a lower computer control system 2, a two-dimensional turntable 3, a base and data transmission interface 4, as well as an upper computer. The measurement probe 1 is fixed to a pitch axis of a support and is supported and driven by the two-dimensional turntable 3, which is symmetrical U-shaped, and the symmetrical U-shaped structure can reduce inertia moment. Three parallel light cylinders, that is, a polarization imaging light cylinder 5, a visible light measurement light cylinder 6, and a near infrared measurement light cylinder 7, are assembled at a front end of the measurement probe 1. A division-of-focal plane polarization camera 10, a double-path spectrometer and a polarization wheel are correspondingly installed in the measurement probe 1. The division-of-focal plane polarization camera 10 is installed behind the polarization imaging light cylinder 5, the polarization wheel and the double-path spectrometer are installed behind the visible light measurement light cylinder 6 and the near infrared measurement light cylinder 7, respectively. The double-path spectrometer includes a visible light spectrometer, and a near infrared spectrometer. The polarization imaging light cylinder 5 is fixed to the front end of the measurement probe, including a fisheye lens 8 located at a head part, and a band-pass filter 9 located in the cylinder, and the division-of-focal plane polarization camera 10 arranged at a rear end of the polarization imaging light cylinder, i.e., inside the measurement probe 1.

Figure 2:
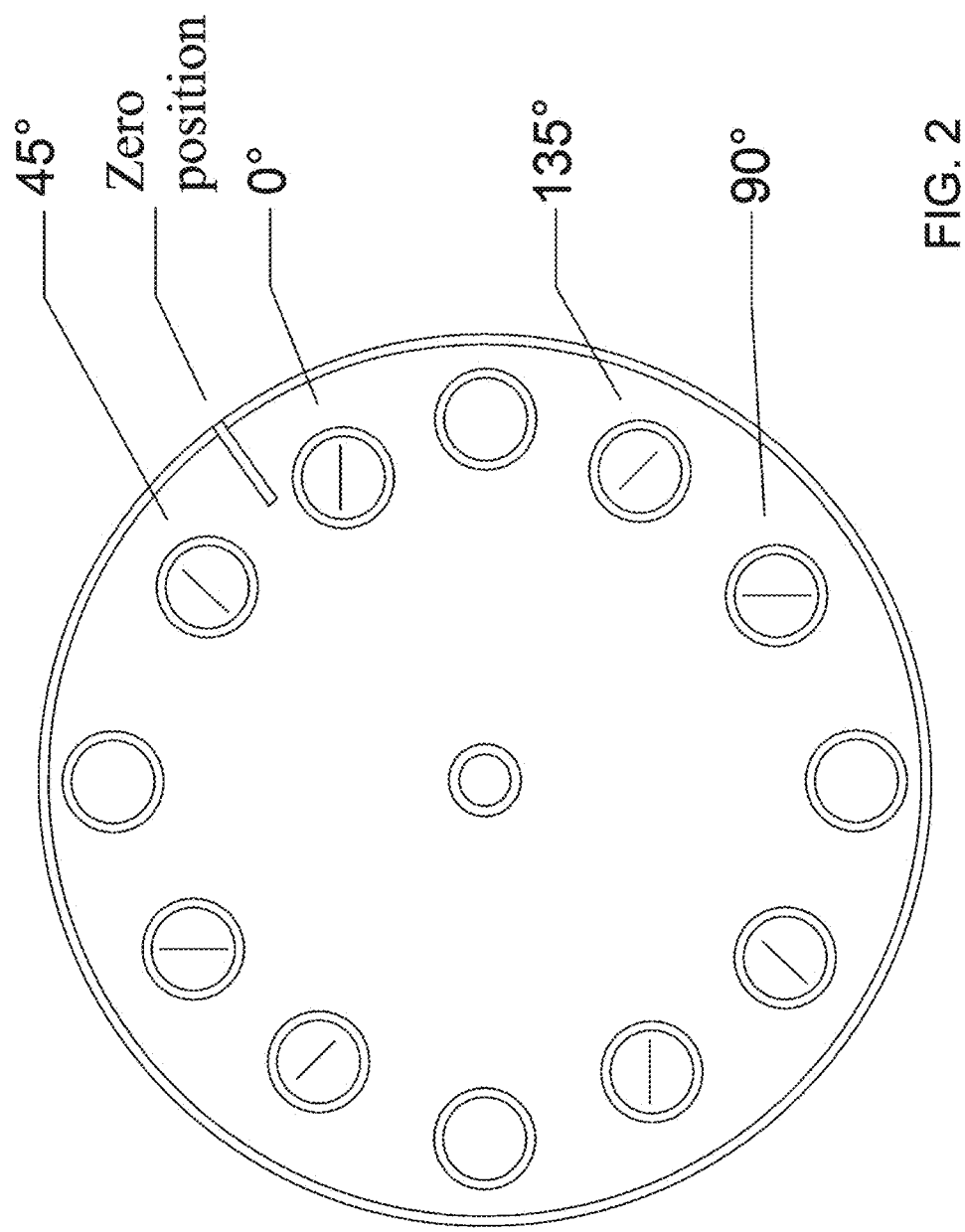
FIG. 2 is a schematic diagram of a polarization wheel.

As shown in FIG. 2, 12 holes, which are a pair of solid holes, a pair of 0° polarizer holes, a pair of 45° polarizer holes, a pair of 90° polarizer holes, a pair of 135° polarizer holes and a pair of through holes, are formed in the polarization wheel, Each pair of the holes is symmetrically installed for measuring dark noise, four groups of polarized radiation, and the background light.

As shown in FIG. 1 and FIG. 3, a fisheye lens 8 can be installed at the head part of the polarization imaging light cylinder 5, the band-pass filter 9 can be embedded into a middle part of the polarization imaging light cylinder 5, and the division-of-focal plane polarization camera 10 can be connected to the rear end of the polarization imaging light cylinder 5. The fisheye lens has a wide field of view (185°), lockable aperture control, and fixed focus, and configured for capturing a full-sky image. Center wavelength of the band-pass filter 9 is selected from five bands: 405 nm, 450 nm, 550 nm, 660 nm and 850 nm, has a full width at half maximum (FWHM) of 10 nm, and is configured for detecting polarized light in a wavelength range from visible light to near infrared. A diameter of the band-pass filter 9 is 24 mm, thus facilitating replacement in a C-mount of the polarization imaging light cylinder 5.

The division-of-focal plane polarization camera 10 is configured for polarization imaging of skylight background radiation, and has a black-and-white CMOS sensor 13 with 5 million pixels, and a microlens array 11 and a polarizer array 12 are integrated on a target surface of the division-of-focal plane polarization camera 10. The polarizer array 12 is composed of wire-grid polarizers in four directions (with a transmission axis of 0°, 45°, −45° and 90°, respectively), each pixel corresponds to a polarization direction, and pixels of the four polarization directions form a super pixel element for imaging calculation. When incident light reaches the polarizer array, a part of the incident light with a polarization direction perpendicular to a wire-grid axis passes through the polarizer array and is received by a photodiode in the CMOS sensor 13, and a part of the incident light with a polarization direction parallel to the wire-grid axis is reflected and absorbed.

The division-of-focal plane polarization camera 10 has extremely low readout noise and high sensitivity, and can scan the whole field of view simultaneously by a global shutter, which is suitable for real-time full-sky imaging. The compact appearance design provides passive thermal management, which can reduce dark current without a cooling fan and a semiconductor refrigeration sheet. Performance parameters are shown in Table 1.

TABLE 1

| Item | Function |
| --- | --- |
| Sensor type | Monochrome CMOS |
| Pixels (Horizontal * Vertical) | 2448 * 2048 |
| Target surface format | 2/3" |
| Maximum frame rate | 35 fps |
| ADC resolution | 12 Bits |
| Shutter type | Global |
| Lens interface | C-Mount |
| Working temperature | 10° C. to 40° C. |

The polarization imaging light cylinder 5 is also used for sun tracking. Accurately tracking the sun is the basis of measuring and calculating background radiation polarization with reference to the sun. In order to ensure the tracking accuracy, a radiometer adopts a dual-mode tracking technology that combines an astronomical apparent sun trajectory method and a fisheye imaging tracking method. In the aspect of sun tracking algorithm, firstly, parameters such as latitude and longitude, local time, and altitude are set in a software interface of the upper computer, and an altitude angle and an azimuth angle of a solar running trajectory are calculated by means of a built-in astronomical apparent sun trajectory algorithm in the system, and the two-dimensional turntable 3 is driven to rotate until the imaging of the sun is located in the middle of the fisheye lens 8, thus completing the preliminary tracking. Afterwards, an edge of the sun in the imaging of the fisheye lens 8 is detected by the division-of-focal plane polarization camera 10, a centroid position (x, y) is calculated, and centroid coordinates of the solar facula is compared with center coordinates of an image field of view $(x_0, y_0)$ of the camera to obtain horizontal and vertical pixel spacings $\Delta x = x - x_0$, $\Delta y = y - y_0$, where x and y are horizontal and vertical coordinates of a solar centroid position in the image, respectively; $x_0$ and $y_0$ are horizontal and vertical coordinates of the center position of the image field of view, respectively; and $\Delta x$ and $\Delta y$ are difference between the horizontal and vertical coordinates of the solar centroid position in the image and the center position of the image field of view, respectively. Distance between two pixels is converted into number of motor driving steps, so as to obtain and track the solar centroid position in real time.

The visible light measurement light cylinder 6 and the near infrared measurement light cylinder 7 are configured for collecting skylight background radiation polarization data, and are composed of a field diaphragm group, a lens, polarizers at different angles, light guiding fibers, and a double-path spectrometer. The double-path spectrometer employs a visible light spectrometer and a near infrared spectrometer, and can collect spectrum in a range of 400 nm~1100 nm, and has resolution superior to 1 nm. A receiving field of view of both the visible light measurement light cylinder 6 and the near-infrared measurement light cylinder 7 is designed to be 1°. When the background radiation passes through a dustproof window, front and rear field diaphragms and aperture diaphragms of the field diaphragm group are configured to limit the field of view and luminous flux. Two-stage evanescent field diaphragm and an achromatic doublet can effectively eliminate stray light beyond 1°. A focal length of an optical path is designed to be 136 mm, a size of a corresponding solar facula is 1.26 mm, and a photosensitive surface of the double-path spectrometer is not less than 2.5 mm. The above optical path design not only can enable the solar facula fully enter a receiving surface of a light guide unit, but also provide enough space margin for adjusting a dovetail groove in a tracking light cylinder, thus reducing a parallelism error between a measurement optical axis and a tracking optical axis. In order to minimize the influence of stray light on measurement data, the visible light measurement light cylinder 6, the near infrared measurement light cylinder 7, and the multi-level field diaphragm are all blackened to ensure that diffused stray light outside a field angle cannot enter the optical path.

The polarization wheel is driven by a 42 mm stepper motor to rotate, a slit is formed in the polarization wheel, and a PNP photoelectric switch is installed in such a way that the polarization wheel passes through the middle of the PNP photoelectric switch, and the PNP photoelectric switch outputs a high level signal "1" when encountering the slit, the high level signal is collected by the lower computer control system 2, the 42 mm stepper motor of the polarization wheel stops rotating, where is set as a zero position. The holes are formed in the polarization wheel at intervals of 30°, including eight centrally symmetrical polarizer holes, two solid holes and two through holes, totaling 12 holes. The whole polarization wheel is blackened to reduce interference caused by light reflection on measurement.

The lower computer control system 2 is a lower embedded master controller based on ARM-Linux, and is configured to schedule and control the operation of the two-dimensional turntable 3 and the collection of the double-path spectrometer, to receive position information and spectral data, and then to transmit the position information and spectral data to a client. Specifically, the lower computer control system selects a 32-bit ARMCortex-A7 core microprocessor as a central processing unit and Linux OS as a software platform. A control motherboard has peripheral interfaces such as a UART (Universal Asynchronous Receiver/Transmitter) serial port, adaptive Ethernet, a USB (Universal Serial Bus) Host interface, etc. The lower computer control system 2 is arranged in a side arm of the two-dimensional turntable 3.

The two-dimensional turntable 3 can control the measurement probe 1 to rotate in two orthogonal dimensions of the horizontal axis and the pitch axis, and stabilize the measurement probe 1 in a set inertial space, thus completing stable and accurate positioning of a target. The two-dimensional turntable 3 is composed of components such as a motor, an encoder, and a driver. The motor is a horizontal and pitch motor, and a direct current brushless torque motor is used as the motor, which has a peak torque of 8 N·M and a continuous locked-rotor torque of 3.6 N·M. The encoder employs an absolute grating system with a circular grating as an angle encoder to form an absolute photoelectric encoder, each position on the motor is encoded through an optical encoder, and thus an angular position read by the encoder is unique, there is no need to determine a reference point and count every time when the power is on. Therefore, both interference immunity and data reliability are significantly improved.

The driver communicates with the lower computer by a CANopen protocol. The driver is connected to the lower computer and the encoder in a servo module. On the one hand, the driver receives an instruction from the lower computer to drive the motor to rotate by a corresponding angle; and on the other hand, the driver obtains a current position of the two-dimensional turntable 3 by reading data from the encoder and transmits the current position of the two-dimensional turntable 3 back to the lower computer, which is convenient for the lower computer to check whether the motor has reached a target position or not, thus forming a closed loop.

The base and data transmission interface is configured for power supply, camera data transmission, and communication between the upper computer and the lower computer. The upper computer and the lower computer are connected by a network cable, and perform data communication using TCP/IP.

Performance indicators of the device are shown in Table 2.

TABLE 2

| Performance characteristic | Indicator parameter |
| --- | --- |
| Measurement wavelength of spectrometer | 400-1100 nm |
| Measurement wavelength of camera | 400-900 nm |
| Measurement mode | Fixed-point measurement, Solar meridian scanning, full-sky scanning, full-sky imaging |

TABLE 2-continued

| Performance characteristic | Indicator parameter |
|---|---|
| Angle of Field of view of fisheye | 185° C. |
| Integration time of spectrometer | 1 ms to 320 ms |
| Temperature control error | 40 ± 0.5° C. |

Further, the present disclosure provides a cooperative polarization skylight background radiation measurement method, the principle of which is as follows:

In the polarization remote sensing filed, Stokes vector $S=(S_0, S_1, S_2, S_3)^T$ is generally written as $S=(I, Q, U, V)^T$, I represents total light intensity, Q and U are two linear polarization components perpendicular to each other, V is a circular polarization component. Because the circular polarization component in the sky polarized light is very small, the V component can be ignored in the measurement, i.e., V=0.

When a beam of polarized light is incident on an optical element, a linear polarizer or an optical system, a Mueller matrix is used to describe the changes in the incident light by a polarizing device or the optical system. S is used to represent the Stokes vector of the incident light, S' represents the Stokes vector of outgoing light, M represents the Mueller matrix of the polarizing device or the optical system, S'=M*S, that is, $$\begin{bmatrix} I' \\ Q' \\ U' \\ V' \end{bmatrix} = \begin{bmatrix} m_{00} & m_{01} & m_{02} & m_{03} \\ m_{10} & m_{11} & m_{12} & m_{13} \\ m_{20} & m_{21} & m_{22} & m_{23} \\ m_{30} & m_{31} & m_{32} & m_{33} \end{bmatrix} * \begin{bmatrix} I \\ Q \\ U \\ V \end{bmatrix} \quad (3)$$

$m_{ij}$ (i=0, 1, 2, 3; j=0, 1, 2, 3) describes relationship between an input polarization state and an output polarization state.

For any beam of incident light, when the Mueller matrix of the polarizing device or optical system is known, polarization state of the outgoing light thereof can be obtained. The light intensity of the outgoing light is tested by a spectrometer, and the linear polarizer is used as an ideal optical polarizing device. When an included angle between a main light-transmitting axis and a reference axis of the polarizing device is Φ, the Mueller matrix of the optical polarizing device can be expressed as follows:

$$M = \frac{1}{2}\begin{bmatrix} 1 & \cos 2\phi & \sin 2\phi & 0 \\ \cos 2\phi & \cos^2 2\phi & \cos 2\phi \sin 2\phi & 0 \\ \sin 2\phi & \cos 2\phi \sin 2\phi & \sin^2 2\phi & 0 \\ 0 & 0 & 0 & 0 \end{bmatrix} \quad (4)$$

A first line of the Stokes vector represents the total light intensity of the incident light, which is expressed here as I'(Φ), the following can be measured through the spectrometer:

$$I'(\phi) = \frac{1}{2}[I + Q(\cos 2\phi) + U(\sin 2\phi)] \quad (5)$$

Due to the fact that I, Q and U are unknown parameters, the unknown number can be inversely calculated by substituting three different Φ values. In the present disclosure, three of 0°, 45°, 90° and 135° can be used as Φ for measurement, and testing results can be substituted into the above formula to obtain the follows:

$$\begin{cases} I'(0°) = \frac{1}{2}(I + Q) \\ I'(45°) = \frac{1}{2}(I + U) \\ I'(90°) = \frac{1}{2}(I - Q) \end{cases} \quad (6)$$

I'(0°), I'(45°), I'(90°) and I'(135°) are light intensity values measured by the spectrometer when the included angle between the main light-transmitting axis and the reference axis of the polarizer is 0°, 45°, 90° and 135°, respectively. An equation set is organized as follows:

$$\begin{cases} I = I'(0°) + I'(90°) \\ Q = I'(0°) - I'(90°) \\ U = 2I'(45°) - I'(0°) - I'(90°) \end{cases} \quad (7)$$

U component may be represented as U=I'(45°)−I'(135°), which can be substituted into $$P = \frac{\sqrt{Q^2 + U^2}}{I} \quad (8)$$

$$\tan 2\chi = \frac{U}{Q} \quad (9)$$

to obtain a degree P of polarization and an azimuth angle χ of polarization.

Figure 4:
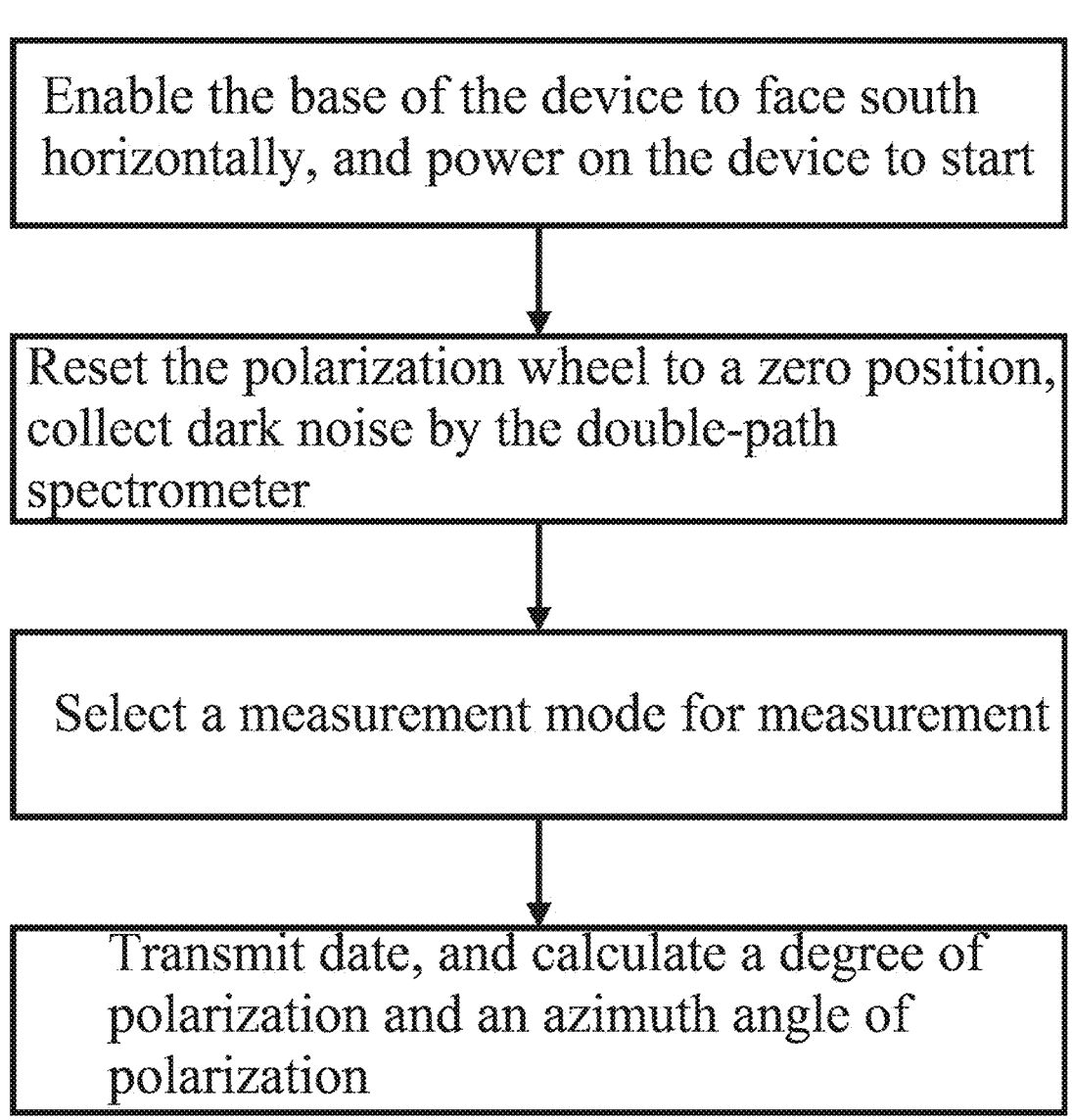
FIG. 4 is a flow diagram of a cooperative polarization skylight background radiation measurement method according to the present disclosure.

As shown in FIG. 4, the cooperative polarization skylight background radiation measurement method of the present disclosure includes the following steps:

Step one: the cooperative skylight background radiation polarization measurement device is built, the base is moved to face south horizontally, and the device is powered on to start.

Step two: the device is initialized, the polarization wheel is reset to a zero position, and dark noise is collected by the double-path spectrometer.

Step three: a measurement mode is selected for measurement, wherein the measurement mode includes fixed-point measurement mode, solar meridian scanning mode, full-sky scanning mode, and full-sky imaging mode.

Figure 5:
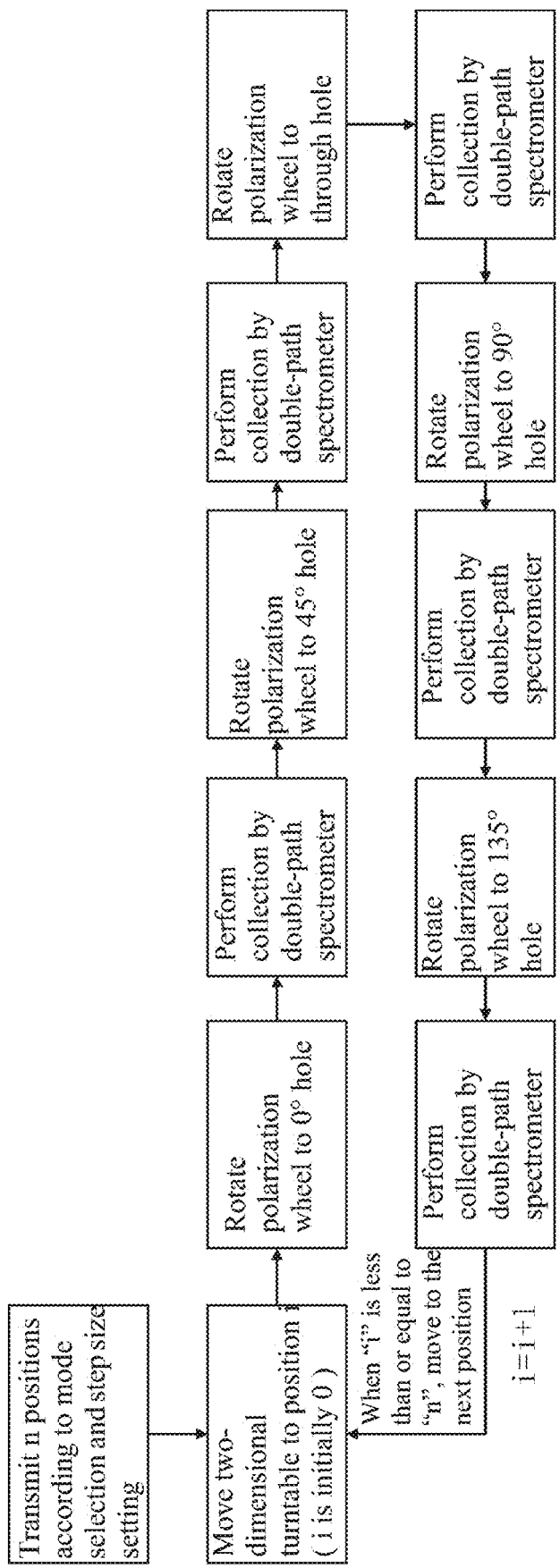
FIG. 5 is a flow diagram of fixed-point measurement.

In the fixed-point measurement, a two-dimensional turntable is controlled by program to be moved to a sky orientation to be measured, the polarization wheel is rotated, and light intensity is collected by the double-path spectrometer. At each position, the polarization wheel is rotated, and the light intensity is collected by the double-path spectrometer, where a working flow is shown in FIG. 5. Specifically, at a certain position, the polarization wheel is rotated to a 0° hole, the light intensity is collected by the double-path spectrometer; the polarization wheel is rotated to a 45° hole, the light intensity is collected by the double-path spectrometer; the polarization wheel is rotated to a through hole, the light intensity is collected by the double-path spectrometer; the polarization wheel is rotated to a 90° hole, the light intensity is collected by the double-path spectrometer; and the polarization wheel is rotated to a 135° hole, the light intensity is collected by the double-path spectrometer, thus completing one cycle. According to the selection of mode and the setting of step size, the measurement probe 1 is driven by the two-dimensional turntable 3 to the next position to repeat the above cycle.

In the solar meridian scanning, sun and a solar meridian are positioned by means of an apparent sun trajectory method and a fisheye imaging tracking method, the solar meridian refers to an arc connecting North pole of the earth, sun, and South pole of the earth. An unequal step size is set (the closer to the sun, the greater the step size). The two-dimensional turntable is moved to make the measurement probe 1 scan the solar meridian step by step, the polarization wheel is rotated, and the light intensity is collected by the double-path spectrometer.

In the full-sky scanning, a sun orientation is positioned as a starting point of a horizontal orientation, horizontal and pitching unequal step sizes are set (the closer to the sun, the larger the step sizes). The two-dimensional turntable 3 is moved to make the measurement probe 1 scan a sky hemisphere step by step, and at each position, the polarization wheel is rotated, and the light intensity is collected by the double-path spectrometer.

Figure 6:
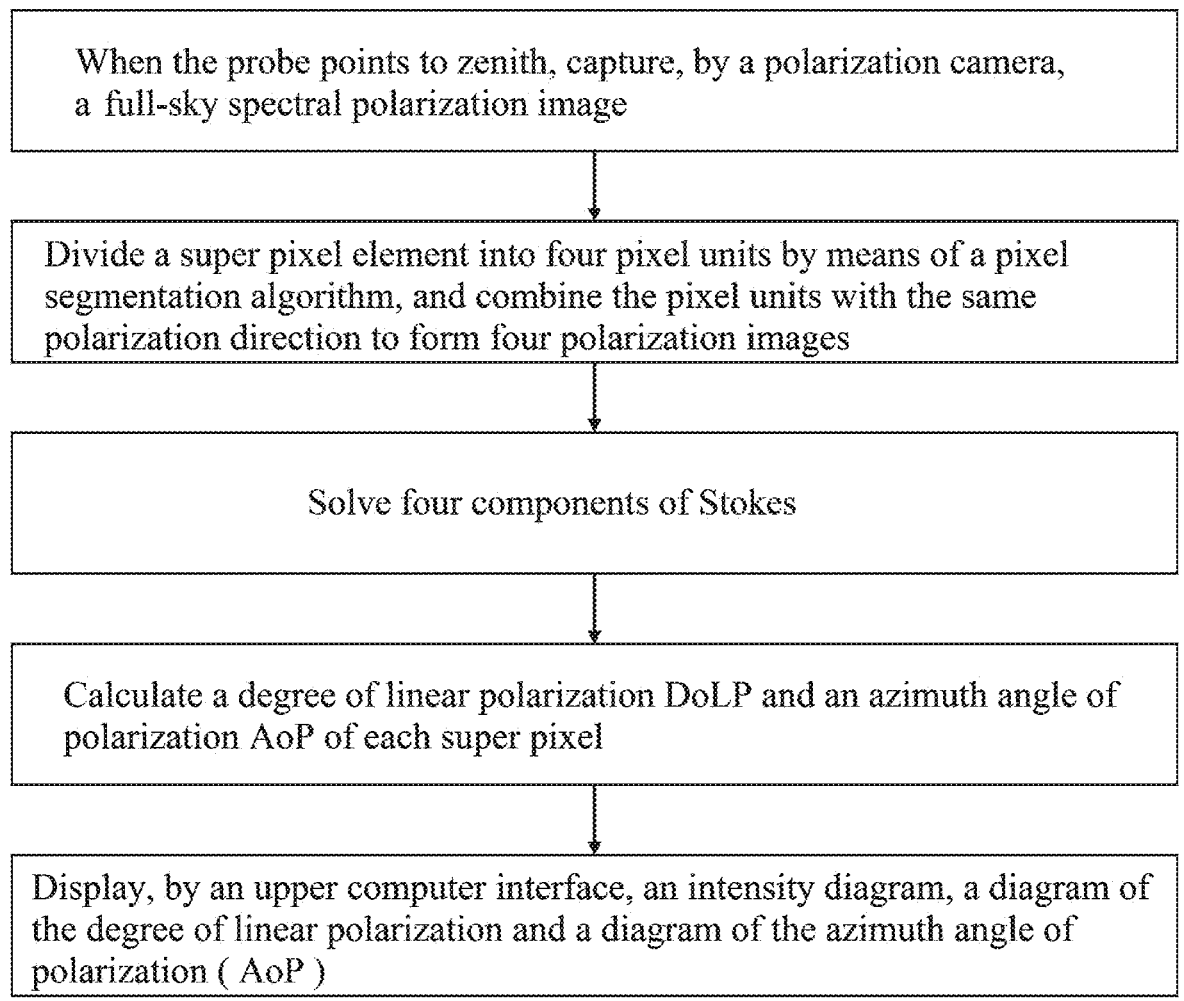
FIG. 6 is a flow diagram of full-sky imaging.

In the full-sky imaging, when the two-dimensional turntable 2 drives the measurement probe 1 to point to zenith, a full-sky spectral polarization image is captured by the division-of-focal plane polarization camera 10, and each super pixel element is divided into four-pixel units by means of a pixel segmentation algorithm, and pixel units with the same polarization direction are combined to form four polarization images. Four components of Stokes vector S, which are total light intensity I, two linear polarization components Q and U perpendicular to each other, and a circular polarization component V, are calculated by matrix operation, and then a degree of linear polarization DoLP and an azimuth angle of polarization AoP for each super pixel are calculated, and an imaging step is as shown in FIG. 6:

$$DoLP = \frac{\sqrt{Q^2 + U^2}}{I} \quad (10)$$

$$AoP = \frac{1}{2}\arctan\left(\frac{U}{Q}\right). \quad (11)$$

Figure 7:
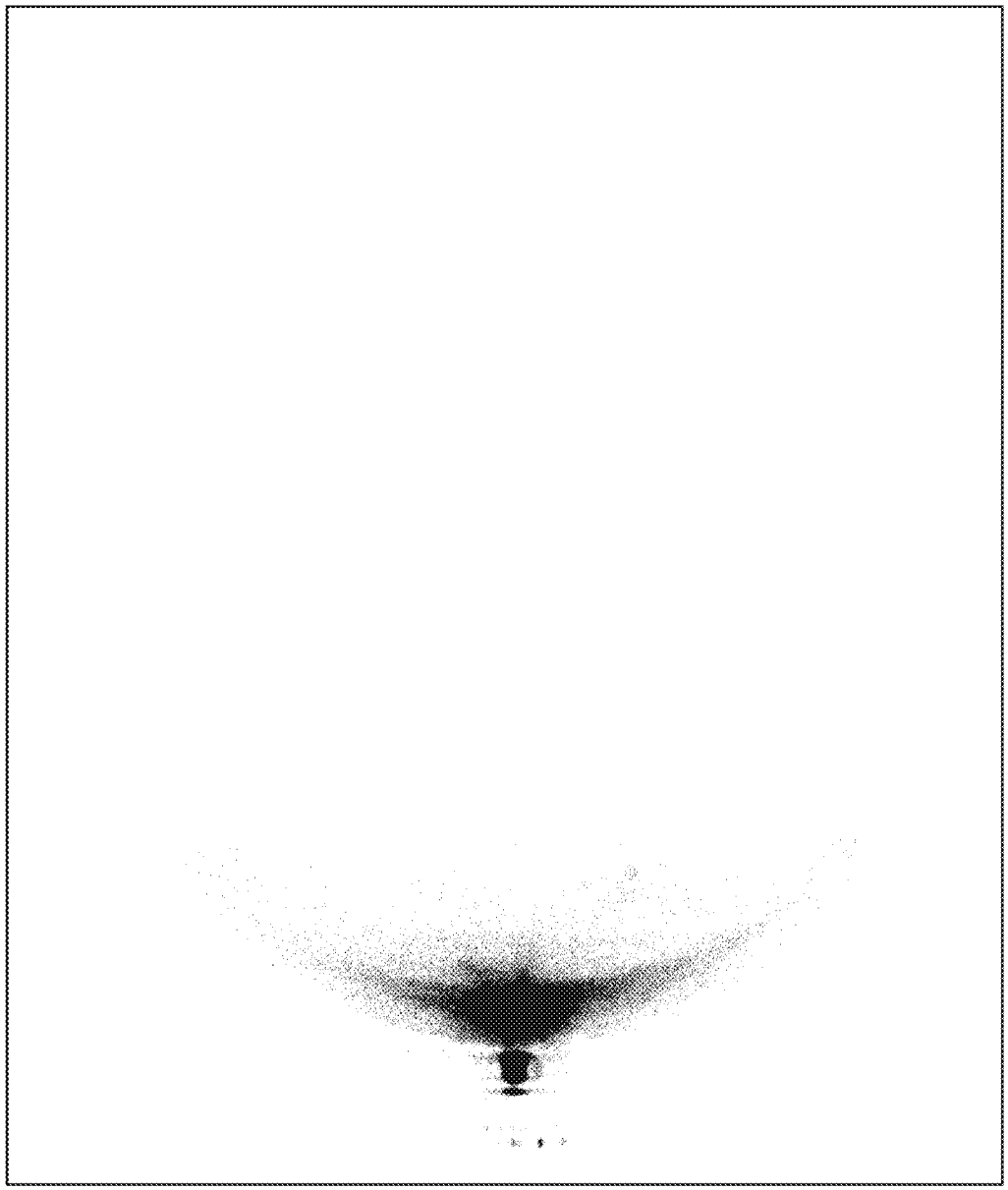
FIG. 7 is a diagram of light intensity.
Figure 8:
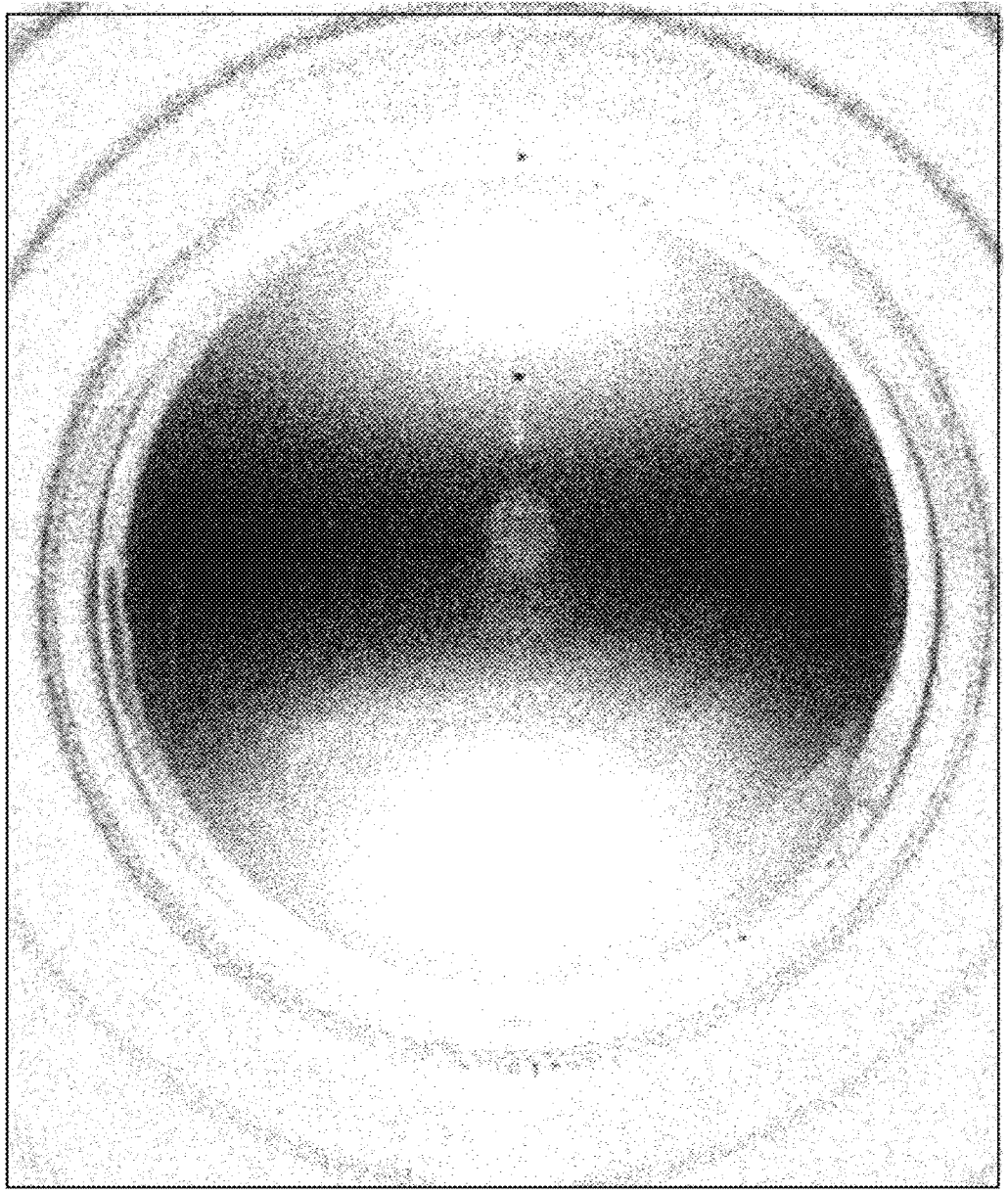
FIG. 8 is a diagram of a degree of linear polarization (DoLP)
Figure 9:
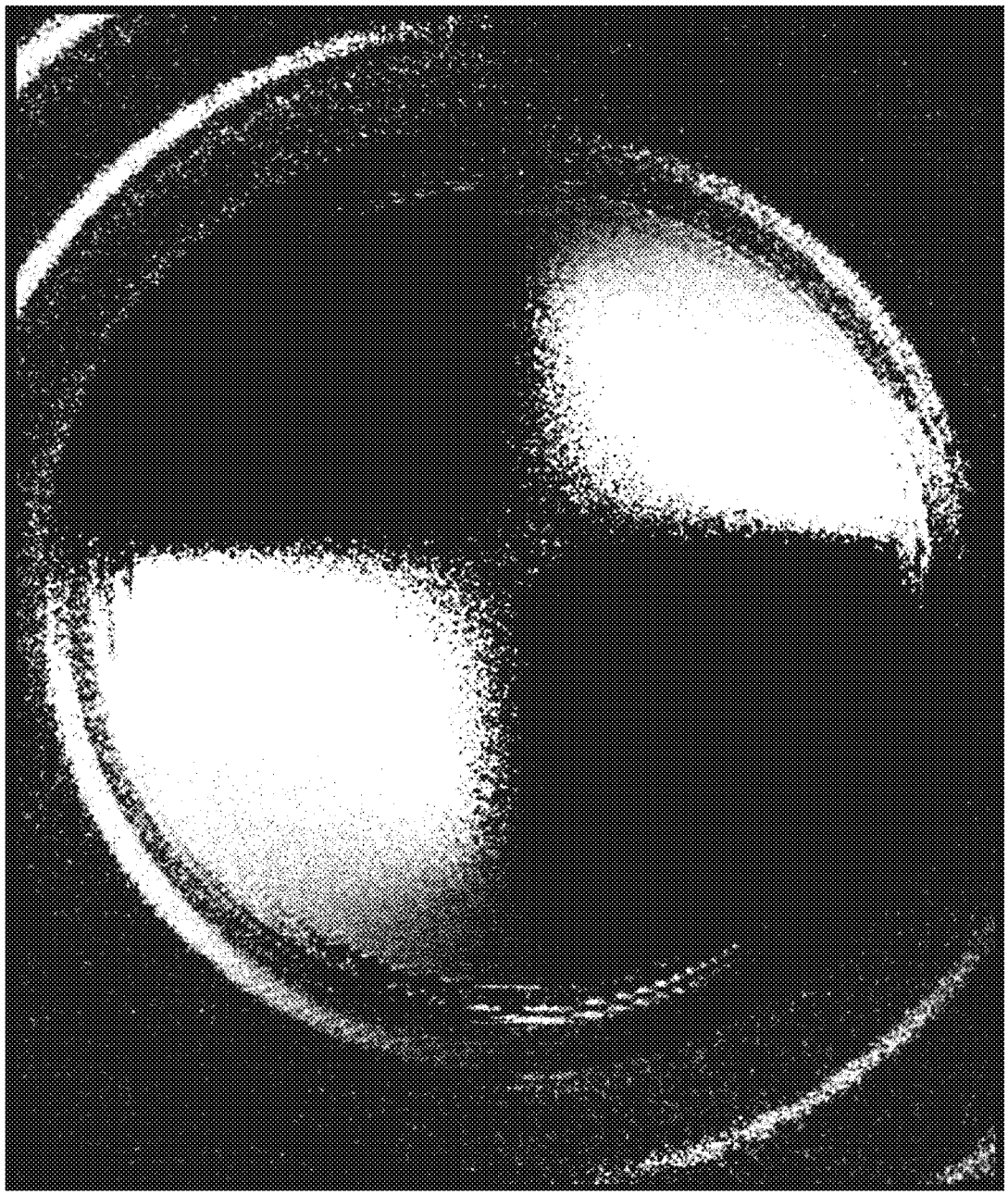
FIG. 9 is a diagram of an azimuth angle of polarization (AoP).

It is designed that an upper computer interface of the upper computer can display an intensity graph, a diagram of the degree of linear polarization (DoLP) and a diagram of an azimuth angle of polarization (AoP). Examples of the results are shown in FIG. 7, FIG. 8 and FIG. 9.

Step four: the spectral polarization data of each band acquired by the double-path spectrometer and the division-of-focal plane polarization camera 10 are transmitted to the upper computer through a data line, original spectral light intensity data is calculated according to a measurement principle, and finally, the degree of polarization and the azimuth angle of polarization can be obtained.

During actual measurement, the polarization information collected by the double-path spectrometer in the division-of-time method and the polarization image data captured by the division-of-focal plane polarization camera 10 can complement each other to replace distorted or abnormal data, thus ensuring the validity of the measurement data by comparing the results. For example, in clear and cloudless weather conditions, the measurement is mainly carried out by the division-of-focal plane polarization camera 10, and supplemented by the double-path spectrometer in the division-of-time method. The measurement results of the double-path spectrometer can better verify the measurement results of the division-of-focal plane polarization camera, such as the neutral point of the skylight polarization mode. In cloudy or harsh environmental conditions, the measurement is mainly carried out by the double-path spectrometer in the division-of-time method, supplemented by the division-of-focal plane polarization camera 10, and the measurement results of the division-of-focal plane polarization camera 10 can provide interpolation for the measurement data of the double-path spectrometer.

Those skilled in the art can easily understand that the above is only the preferred embodiment of the present disclosure, rather than limiting the present disclosure. Any modification, equivalent substitution and improvement made within the spirit and principle of the present disclosure should be included in the scope of protection of the present disclosure.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A cooperative polarization skylight background radiation measurement device, comprising a measurement probe, a lower computer control system, a two-dimensional turntable, a base and data transmission interface, as well as an upper computer, wherein the measurement probe is fixed to a pitch axis of a support, and is supported and driven by the two-dimensional turntable which is symmetrical U-shaped; three parallel light cylinders, a polarization imaging light cylinder, a visible light measurement light cylinder, and a near infrared measurement light cylinder, are assembled at a front end of the measurement probe; a division-of-focal plane polarization camera, a polarization wheel, and a double-path spectrometer are installed inside the measurement probe corresponding to the three parallel light cylinders, respectively;

a fisheye lens is installed at a head part of the polarization imaging light cylinder, a band-pass filter is embedded into a middle part of the polarization imaging light cylinder, and the division-of-focal plane polarization camera is connected to a rear end of the polarization imaging light cylinder; the division-of-focal plane polarization camera is configured for polarized imaging of skylight background radiation, and has a black-and-white Complementary Metal-Oxide-Semiconductor (CMOS) sensor with 5 million pixels, and a microlens array and a polarizer array are integrated on a target surface of the division-of-focal plane polarization camera;

the polarizer array is composed of wire-grid polarizers in four directions, with a transmission axis of 0°, 45°, −45° and 90°, respectively, each pixel corresponds to a polarization direction, and pixels of four polarization directions form a super pixel element for imaging calculation; when incident light reaches the polarizer array, a part of the incident light with a polarization direction perpendicular to a wire-grid axis passes through the polarizer array and is received by a photodiode in the CMOS sensor, and a part of the incident light with a polarization direction parallel to the wire-grid axis is reflected and absorbed;

12 holes, which are a pair of solid holes, a pair of 0° polarizer holes, a pair of 45° polarizer holes, a pair of through holes, a pair of 90° polarizer holes, and a pair of 135° polarizer holes, are formed in the polarization wheel, and each pair of holes is installed in a centrally symmetrical manner for measuring dark noise, four groups of polarized radiation, and background light.

2. The cooperative polarization skylight background radiation measurement device according to claim 1, wherein:

the fisheye lens has a field of view of 185°, locked aperture control, and fixed focus, and is configured for capturing a full-sky image;

a center wavelength of the band-pass filter is within a filter band, the filter band being one of 405 nm, 450 nm, 550 nm, 660 nm, and 850 nm;

the band-pass filter has a full width at half maximum (FWHM) of 10 nm; and the band-pass filter is configured for detecting polarized light in a wavelength range from visible light to near infrared.

3. The cooperative polarization skylight background radiation measurement device according to claim 1, wherein the division-of-focal plane polarization camera is able to scan the whole field of view simultaneously via a global shutter, thereby enabling real-time full-sky imaging.

4. The cooperative polarization skylight background radiation measurement device according to claim 1, wherein:

the visible light measurement light cylinder and the near infrared measurement light cylinder are configured for collecting polarization data of skylight background radiation;

the visible light measurement light cylinder and the near infrared measurement light cylinder comprise a field diaphragm group, a lens, polarizers at different angles, light guiding fibers and a double-path spectrometer;

spectrum collected by the double-path spectrometer is in a range of 400 nm to 1100 nm, and has a resolution of less than or equal to 1 nm;

a receiving field of view of both the visible light measurement light cylinder and the near-infrared measurement light cylinder is 1°;

when the background radiation passes through a dustproof window, front and rear field diaphragms and aperture diaphragms of the field diaphragm group are configured to limit the field of view and luminous flux; and a focal length of an optical path is 136 mm, a size of a corresponding solar facula is 1.26 mm, and a photosensitive surface of the double-path spectrometer is not less than 2.5 mm.

5. The cooperative polarization skylight background radiation measurement device according to claim 4, wherein the visible light measurement light cylinder, the near-infrared measurement light cylinder, and the field diaphragm group are all blackened to ensure that diffused stray light outside a field angle is unable to enter the optical path.

6. The cooperative polarization skylight background radiation measurement device according to claim 4, wherein:

the polarization wheel is rotated by a 42 mm stepper motor;

a PNP photoelectric switch is installed in such a way that the polarization wheel passes through a middle of the PNP photoelectric switch, the PNP photoelectric switch being configured to output a high level signal "1" to the lower computer control system when a slit formed in the polarization wheel is encountered by the PNP photoelectric switch, whereupon the lower computer control system instructs the 42 mm stepper motor to cease the rotation of the polarization wheel, thereby orienting the polarization wheel at a zero position; and the polarization wheel is blackened to reduce measurement interference caused by light reflection.

7. The cooperative polarization skylight background radiation measurement device according to claim 4, wherein:

the two-dimensional turntable comprises a motor, an encode, and a driver;

the motor is a horizontal and pitch motor;

the motor is a direct current brushless torque motor having a peak torque of 8 N·M and a continuous locked-rotor torque of 3.6 N·M;

the encoder employs an absolute grating system having a circular grating as an angle encoder to form an absolute photoelectric encoder, whereby each position on the motor is encoded through an optical encoder;

the driver communicates with a lower computer using a CANopen protocol;

the driver is connected to the lower computer control system and the encoder in a servo module;

the driver is configured to receive instruction from the lower computer to cause the motor to rotate by a corresponding angle; and the driver is configured to obtain a current position of the two-dimensional turntable by reading data from the absolute photoelectric encoder and to transmit the current position of the two-dimensional turntable back to the lower computer, thereby enabling the lower computer to determine whether the motor has reached a target position.

8. The cooperative polarization skylight background radiation measurement device according to claim 1, wherein:

the base and data transmission interface is configured for power supply, camera data transmission, and communication between the upper computer and the lower computer; and the upper computer and the lower computer are connected by a network cable, and perform data communication thereby according to Transmission Control Protocol/Internet Protocol (TCP/IP).

9. A measurement method for the cooperative polarization skylight background radiation measurement device according to claim 1, comprising the following steps:

step one: building the cooperative skylight background radiation polarization measurement device, enabling the base to be moved to face south horizontally, and powering on the device to start;

step two: initializing the cooperative skylight background radiation polarization measurement device, resetting the polarization wheel to a zero position, and collecting dark noise by the double-path spectrometer;

step three: selecting a measurement mode for measurement, wherein the measurement mode includes fixed-point measurement mode, solar meridian scanning mode, full-sky scanning mode, and full-sky imaging mode; and step four: transmitting spectral polarization data of each band acquired by the double-path spectrometer and the division-of-focal plane polarization camera to the upper computer through a data line, calculating original spectral light intensity data according to a measurement principle, and finally obtaining a degree of polarization and an azimuth angle of polarization.

10. The measurement method according to claim 9, wherein:

in the fixed-point measurement mode:
the two-dimensional turntable is moved to a sky orientation to be measured;
the polarization wheel is rotated;
light intensity is collected by the double-path spectrometer;
at each position, the polarization wheel is rotated; and the light intensity is collected by the double-path spectrometer;

in the solar meridian scanning mode:
sun and a solar meridian are positioned by an apparent sun trajectory method and a fisheye imaging tracking method, wherein the solar meridian refers to an arc connecting North pole of the earth, sun and South pole of the earth;
an unequal step size is set, wherein the closer to the sun, the greater the step size;
the two-dimensional turntable is moved to cause the measurement probe to scan the solar meridian step by step, the polarization wheel is rotated, and the light intensity is collected by the double-path spectrometer;

in the full-sky scanning mode:
a sun orientation is positioned as a starting point of a horizontal orientation;
horizontal and pitching unequal step sizes are set, wherein the closer to the sun, the greater the step size;
the two-dimensional turntable is moved to cause the measurement probe to scan a sky hemisphere step by step; and
at each position, the polarization wheel is rotated, and the light intensity is collected by the double-path spectrometer;

in the full-sky imaging mode:
the two-dimensional turntable drives the measurement probe to point to zenith;
a full-sky spectral polarization image is captured by the division-of-focal plane polarization camera;
each super pixel element is divided into four-pixel units by means of a pixel segmentation algorithm, whereby pixel units having the same polarization direction are combined to form four polarization images;
four components of Stokes vector S, which are total light intensity I, two linear polarization components Q and U perpendicular to each other, and a circular polarization component V, are calculated by means of a matrix operation; and
a degree of linear polarization DoLP and an azimuth angle of polarization AoP for each super pixel element are calculated according to:

$$DoLP = \frac{\sqrt{Q^2 + U^2}}{I} \text{ and } AoP = \frac{1}{2}\arctan\left(\frac{U}{Q}\right).$$

11. The measurement method according to claim 9, wherein in the full-sky scanning mode, the division-of-focal polarization camera and the double-path spectrometer operate simultaneously to collect full-sky polarization information.

12. The measurement method according to claim 9, wherein:
the fisheye lens has a field of view of 185°, locked aperture control, and fixed focus, and is configured for capturing a full-sky image;
a center wavelength of the band-pass filter is within a filter band, the filter band being one of 405 nm, 450 nm, 550 nm, 660 nm, and 850 nm;
the band-pass filter has a full width at half maximum (FWHM) of 10 nm; and the band-pass filter is configured for detecting polarized light in a wavelength range from visible light to near infrared.

13. The measurement method according to claim 9, wherein the division-of-focal plane polarization camera is able to scan the whole field of view simultaneously via a global shutter, thereby enabling real-time full-sky imaging.

14. The measurement method according to claim 9, wherein:
the visible light measurement light cylinder and the near infrared measurement light cylinder are configured for collecting polarization data of skylight background radiation;
the visible light measurement light cylinder and the near infrared measurement light cylinder comprise a field diaphragm group, a lens, polarizers at different angles, light guiding fibers and a double-path spectrometer;
spectrum collected by the double-path spectrometer is in a range of 400 nm to 1100 nm, and has a resolution of less than or equal to 1 nm;
a receiving field of view of both the visible light measurement light cylinder and the near-infrared measurement light cylinder is 1°;
when the background radiation passes through a dustproof window, front and rear field diaphragms and aperture diaphragms of the field diaphragm group are configured to limit the field of view and luminous flux; and
a focal length of an optical path is 136 mm, a size of a corresponding solar facula is 1.26 mm, and a photosensitive surface of the double-path spectrometer is not less than 2.5 mm.

15. The measurement method according to claim 14, wherein the visible light measurement light cylinder, the near-infrared measurement light cylinder, and the field diaphragm group are all blackened to ensure that diffused stray light outside a field angle is unable to enter the optical path.

16. The measurement method according to claim 14, wherein:
the polarization wheel is rotated by a 42 mm stepper motor;
a PNP photoelectric switch is installed in such a way that the polarization wheel passes through a middle of the PNP photoelectric switch, the PNP photoelectric switch being configured to output a high level signal "1" to the lower computer control system when a slit formed in the polarization wheel is encountered by the PNP photoelectric switch, whereupon the lower computer control system instructs the 42 mm stepper motor to cease the rotation of the polarization wheel, thereby orienting the polarization wheel at a zero position; and the polarization wheel is blackened to reduce measurement interference caused by light reflection.

17. The measurement method according to claim 14, wherein:

the two-dimensional turntable comprises a motor, an encode, and a driver;

the motor is a horizontal and pitch motor;

the motor is a direct current brushless torque motor having a peak torque of 8 N·M and a continuous locked-rotor torque of 3.6 N·M;

the encoder employs an absolute grating system having a circular grating as an angle encoder to form an absolute photoelectric encoder, whereby each position on the motor is encoded through an optical encoder;

the driver communicates with a lower computer using a CANopen protocol;

the driver is connected to the lower computer control system and the encoder in a servo module;

the driver is configured to receive instruction from the lower computer to cause the motor to rotate by a corresponding angle; and the driver is configured to obtain a current position of the two-dimensional turntable by reading data from the absolute photoelectric encoder and to transmit the current position of the two-dimensional turntable back to the lower computer, thereby enabling the lower computer to determine whether the motor has reached a target position.

18. The measurement method according to claim 9, wherein:

the base and data transmission interface is configured for supplying power, camera data transmission, and communication between the upper computer and the lower computer; and the upper computer and the lower computer are connected by a network cable, and perform data communication thereby according to Transmission Control Protocol/Internet Protocol (TCP/IP).

19. The measurement method according to claim 12, wherein:

in the fixed-point measurement mode:
the two-dimensional turntable is moved to a sky orientation to be measured;
the polarization wheel is rotated;
light intensity is collected by the double-path spectrometer;
at each position, the polarization wheel is rotated; and
the light intensity is collected by the double-path spectrometer;

in the solar meridian scanning mode:
sun and a solar meridian are positioned by an apparent sun trajectory method and a fisheye imaging tracking method, wherein the solar meridian refers to an arc connecting North pole of the earth, sun and South pole of the earth;
an unequal step size is set, wherein the closer to the sun, the greater the step size;
the two-dimensional turntable is moved to cause the measurement probe to scan the solar meridian step by step, the polarization wheel is rotated, and the light intensity is collected by the double-path spectrometer;

in the full-sky scanning mode:
a sun orientation is positioned as a starting point of a horizontal orientation;
horizontal and pitching unequal step sizes are set, wherein the closer to the sun, the greater the step size;
the two-dimensional turntable is moved to cause the measurement probe to scan a sky hemisphere step by step; and
at each position, the polarization wheel is rotated, and the light intensity is collected by the double-path spectrometer; and in the full-sky imaging mode:
the two-dimensional turntable drives the measurement probe to point to zenith;
a full-sky spectral polarization image is captured by the division-of-focal plane polarization camera;
each super pixel element is divided into four-pixel units by means of a pixel segmentation algorithm, whereby pixel units having the same polarization direction are combined to form four polarization images;
four components of Stokes vector S, which are total light intensity I, two linear polarization components Q and U perpendicular to each other, and a circular polarization component V, are calculated by means of a matrix operation; and
a degree of linear polarization DoLP and an azimuth angle of polarization AoP for each super pixel element are calculated according to:

$$DoLP = \frac{\sqrt{Q^2 + U^2}}{I} \text{ and } AoP = \frac{1}{2}\arctan\left(\frac{U}{Q}\right).$$

20. The measurement method according to claim 12, wherein when the full-sky imaging mode is selected, the division-of-focal polarization camera and the double-path spectrometer operate simultaneously to collect full-sky polarization information.

* * * * *